United States Patent
Fairy et al.

(10) Patent No.: US 7,513,772 B2
(45) Date of Patent: Apr. 7, 2009

(54) INJECTION MOLDING NOZZLE WITH VALVE PIN ALIGNMENT

(75) Inventors: Fabrice Fairy, Georgetown (CA); Denis Babin, Georgetown (CA); Peter Klobucar, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 42 days.

(21) Appl. No.: 11/746,060

(22) Filed: May 9, 2007

(65) Prior Publication Data

US 2008/0279979 A1    Nov. 13, 2008

(51) Int. Cl.
*B29C 45/00* (2006.01)
(52) U.S. Cl. .................. 425/566; 425/562; 425/564
(58) Field of Classification Search ............. 425/549, 425/564, 566, 562
See application file for complete search history.

(56) References Cited

U.S. PATENT DOCUMENTS

| | | |
|---|---|---|
| 3,716,318 A | 2/1973 | Erik et al. |
| 3,952,927 A | 4/1976 | Schaumburg et al. |
| 4,272,236 A | 6/1981 | Rees et al. |
| 5,125,817 A | 6/1992 | Yamachika |
| 5,200,207 A | 4/1993 | Akselrud et al. |
| 5,334,008 A | 8/1994 | Gellert |
| 5,334,010 A | 8/1994 | Teng |
| 5,505,613 A | 4/1996 | Krummenacher |
| 5,670,190 A | 9/1997 | Osuna-Diaz |
| 5,700,499 A | 12/1997 | Bauer |
| 5,811,140 A * | 9/1998 | Manner ............ 425/564 |
| 5,830,524 A | 11/1998 | Braun |
| 5,834,041 A | 11/1998 | Sekine et al. |
| 5,849,343 A | 12/1998 | Gellert et al. |
| 5,895,669 A | 4/1999 | Seres, Jr. et al. |
| 5,916,605 A | 6/1999 | Swenson et al. |
| 6,089,468 A | 7/2000 | Bouti |
| 6,273,706 B1 | 8/2001 | Gunther |

(Continued)

FOREIGN PATENT DOCUMENTS

CN    2803682    8/2006

(Continued)

OTHER PUBLICATIONS

Mold-Masters, "Bi-Metallic Cyl. Valve", Feb. 28, 2002.

(Continued)

*Primary Examiner*—Yogendra Gupta
*Assistant Examiner*—Maria Veronica D Ewald
(74) *Attorney, Agent, or Firm*—Medler Ferro PLLC

(57) ABSTRACT

An injection molding apparatus is disclosed that includes a valve-gated nozzle having a nozzle tip assembly and a valve pin slidably disposed therein. The nozzle tip assembly includes a nozzle liner having a first valve pin guiding portion, a valve pin guide having a second valve pin guiding portion upstream of the first valve pin guiding portion, and a transfer seal having a bore for receiving the nozzle liner and the valve pin guide therein. The transfer seal bore includes an alignment surface that surrounds the nozzle liner and the valve pin guide to align the first and second valve pin guiding portions with the mold gate, such that the valve pin is accurately aligned during operation. The transfer seal also includes means to couple the nozzle tip assembly to the nozzle body.

18 Claims, 8 Drawing Sheets

U.S. PATENT DOCUMENTS

| | | |
|---|---|---|
| 6,349,886 B1 | 2/2002 | Bouti |
| 6,419,116 B1 | 7/2002 | Eigler et al. |
| 6,485,288 B2 | 11/2002 | Lee |
| 6,743,009 B1 | 6/2004 | Ramond |
| 6,789,745 B1 | 9/2004 | Babin et al. |
| 7,025,586 B2 | 4/2006 | Fischer et al. |
| 7,037,103 B2 | 5/2006 | Niewels |
| 7,108,503 B2 | 9/2006 | Olaru |
| 7,137,807 B2 | 11/2006 | Babin et al. |
| 7,156,651 B2 | 1/2007 | Niewels |
| 2003/0008034 A1 | 1/2003 | Niewels |
| 2004/0146598 A1* | 7/2004 | Sicilia et al. ............ 425/569 |
| 2005/0147713 A1 | 7/2005 | Hagelstein et al. |
| 2006/0018993 A1 | 1/2006 | Fairy |
| 2006/0182843 A1* | 8/2006 | Fischer et al. ............ 425/568 |
| 2006/0251759 A1 | 11/2006 | Gunther |
| 2008/0031997 A1 | 2/2008 | Bazzo et al. |

FOREIGN PATENT DOCUMENTS

| | | |
|---|---|---|
| FR | 2641227 | 7/1990 |
| GB | 1306697 | 2/1973 |
| JP | 2117805 | 5/1990 |
| JP | 5104581 | 4/1993 |
| JP | 5177664 | 7/1993 |
| JP | 6023804 | 2/1994 |
| JP | 6143358 | 5/1994 |
| JP | 7148786 | 6/1995 |
| JP | 8052767 | 2/1996 |
| JP | 8090598 | 4/1996 |
| JP | 11254490 | 9/1999 |
| JP | 2002/355857 | 12/2002 |
| KR | 2000/054693 | 9/2000 |
| KR | 2000-0054693 | 9/2000 |
| KR | 2006-0032980 | 4/2006 |
| KR | 6032980 | 4/2006 |
| NL | 1026839 | 2/2006 |
| WO | WO-2005/018906 | 3/2005 |
| WO | WO-2007/098798 A1 | 9/2007 |

OTHER PUBLICATIONS

Mold-Masters, "Dura Centi-Shot Guided Cyl. Lever Valve", Aug. 1997.

Mold-Masters, "Flex-Dura Hecto Hot Valve", May 29, 1997.

Polimold Industrial S.A., "Catoluge of Products", Aug. 2006, p. 7-10.

* cited by examiner

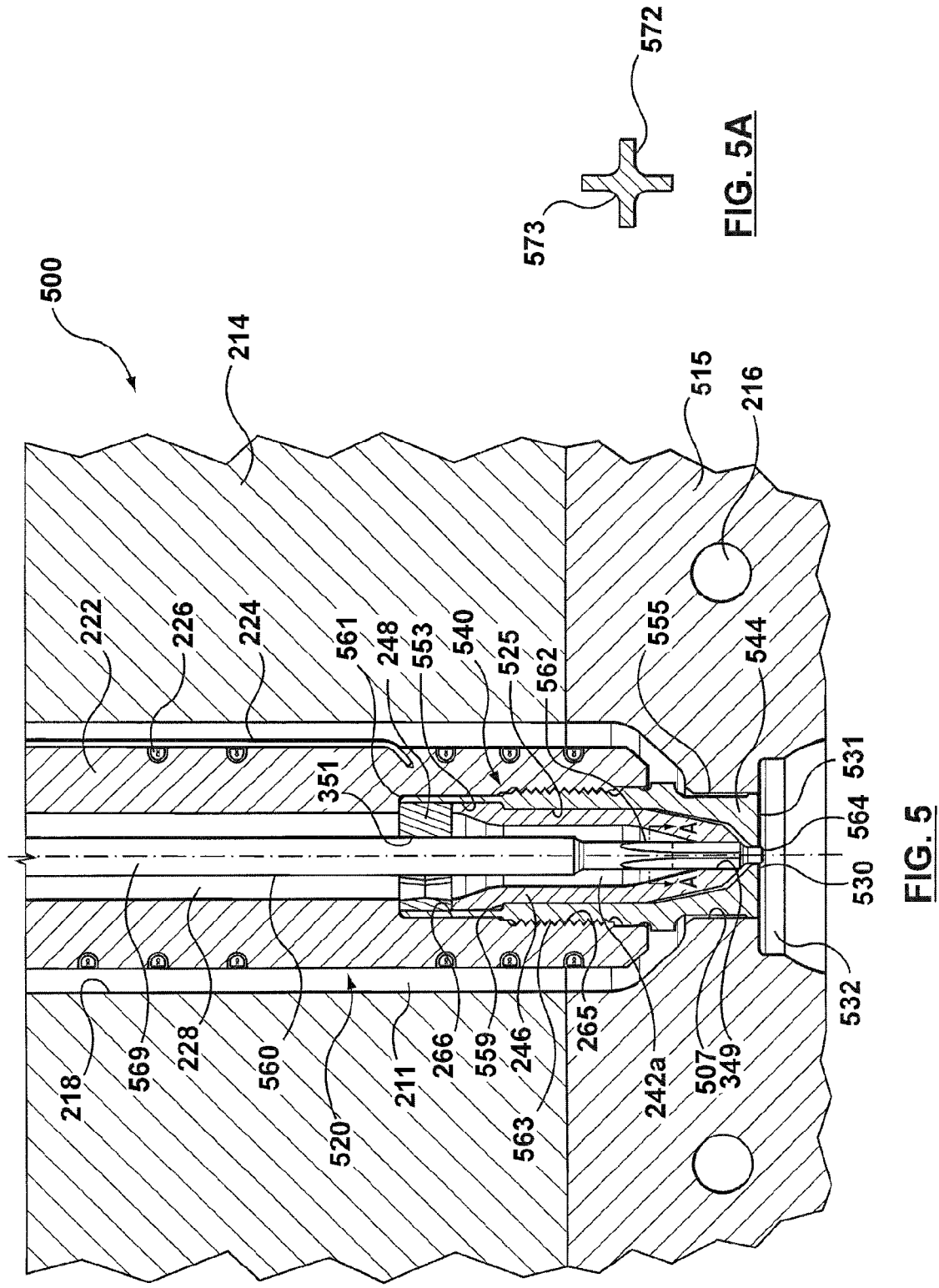

INJECTION MOLDING NOZZLE WITH VALVE PIN ALIGNMENT

FIELD OF THE INVENTION

The invention relates generally to an injection molding system and, in particular, to a hot runner valve-gated nozzle having a nozzle tip that aids in aligning a valve pin with a mold gate.

BACKGROUND OF THE INVENTION

A hot runner injection molding apparatus may include a valve pin gating mechanism at a mold gate of a mold cavity to control the flow of a melt stream into the mold cavity. Typically, the valve pin is disposed within a melt channel of the nozzle to slidably reciprocate between an open position, in which the valve pin is removed from the mold gate, and a closed position, in which the valve pin is seated in the mold gate. In order to provide a good seal at the mold gate, both a tip portion of the valve pin and the corresponding sealing surface of the mold gate must typically be machined to very close tolerances.

Various factors may cause the valve pin tip to become misaligned as it approaches the mold gate. For example, the nozzle in which the valve pin moves may be misaligned with the mold gate. Also, thermal expansion and contraction of various components of the injection molding apparatus, which takes place repeatedly during an injection molding run, may cause components to shift, ultimately resulting in misalignment of the nozzle and, consequently, the valve pin with the mold gate. Another factor may be non-homogeneity in the melt that can cause the melt to exert uneven fluid pressure on the valve pin body pushing the tip, i.e., the sealing end, of the valve pin out of alignment with the mold gate.

When a misaligned valve pin is moved to close a mold gate, the valve pin may collide with the mold gate causing scoring of the sealing surfaces on the valve pin and/or the mold gate. Damage may occur immediately, or alternatively, gradually over many cycles of the valve pin opening and closing the mold gate. This can ultimately result in poor quality parts with blemishes around the mold gate, as well as cause other problems with the molding operation. Furthermore, a damaged valve pin or mold gate can be expensive and time consuming to replace and/or repair.

Various valve pin alignment means that align the tip, or "free end," of the valve pin have been suggested to address the above-identified problem and normally are an additional piece to be assembled with the nozzle. The valve pin alignment means may be positioned towards a downstream end of the nozzle within the nozzle melt channel. However, a high degree of accuracy is necessary in the manufacture of the hot runner injection molding nozzle body, nozzle tip pieces and valve pin alignment means in order to ensure a proper alignment between the valve pin and mold gate when the nozzle is assembled and mounted in the mold plate. Accordingly, there is little room for error in the manufacturing tolerances between the bore or counterbores of the nozzle body and each of the individual components of the nozzle tip and valve pin alignment means, which increases the time and cost of manufacture. If manufacturing errors exist, the misalignment between the valve pin and the mold gate may not be readily corrected without repairing, re-machining and/or replacing one or more of the nozzle components or possibly replacing the entire nozzle.

Thus, a need exists for an injection molding apparatus that provides improved guiding of the valve pin towards the mold gate and that is simpler and cheaper to manufacture.

BRIEF SUMMARY OF THE INVENTION

Embodiments of the present invention are directed to an injection molding apparatus with at least one valve-gated nozzle positioned within a nozzle bore in a mold plate. The nozzle includes a nozzle body, a nozzle tip assembly secured to a downstream end of the nozzle body, and a valve pin slidably disposed therein, wherein a melt stream of moldable material is conveyed through a nozzle melt channel to a mold cavity via a mold gate that is selectively opened and closed by the valve pin. The nozzle tip assembly includes a nozzle liner having an upstream end, a downstream end and defining a first portion of a nozzle tip melt channel, wherein the downstream end of the nozzle liner includes a first valve pin guiding portion for aligning the valve pin with the mold gate. The nozzle tip assembly also includes a valve pin guide positioned in contact with the upstream end of the nozzle liner and defining a second portion of the nozzle tip melt channel, wherein the valve pin guide includes a second valve pin guiding portion upstream of the first valve pin guiding portion for aligning the valve pin with the mold gate. Finally the nozzle tip assembly includes a retainer piece or a transfer seal having a bore for receiving the nozzle liner and the valve pin guide therein, wherein the retainer piece or transfer seal bore has an alignment surface that surrounds the nozzle liner and the valve pin guide to align the first and second valve pin guiding portions with the mold gate and wherein the retainer piece or transfer seal couples the nozzle tip assembly to the nozzle body. Accordingly, the valve pin is guided twice, i.e., by the first valve pin guiding portion of the nozzle liner and the second valve pin guiding portion of valve pin guide.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2A is a cross-sectional view of the valve pin guide of FIG. 2.

FIG. 4 is a cross-sectional view of the valve pin guide of FIG. 2 according to another embodiment of the present invention.

FIG. 5 is a sectional view of an injection molding apparatus according to another embodiment of the present invention.

FIG. 5A is a cross-sectional view of the valve pin of FIG. 5 taken along line A-A.

DETAILED DESCRIPTION OF EMBODIMENTS OF THE PRESENT INVENTION

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
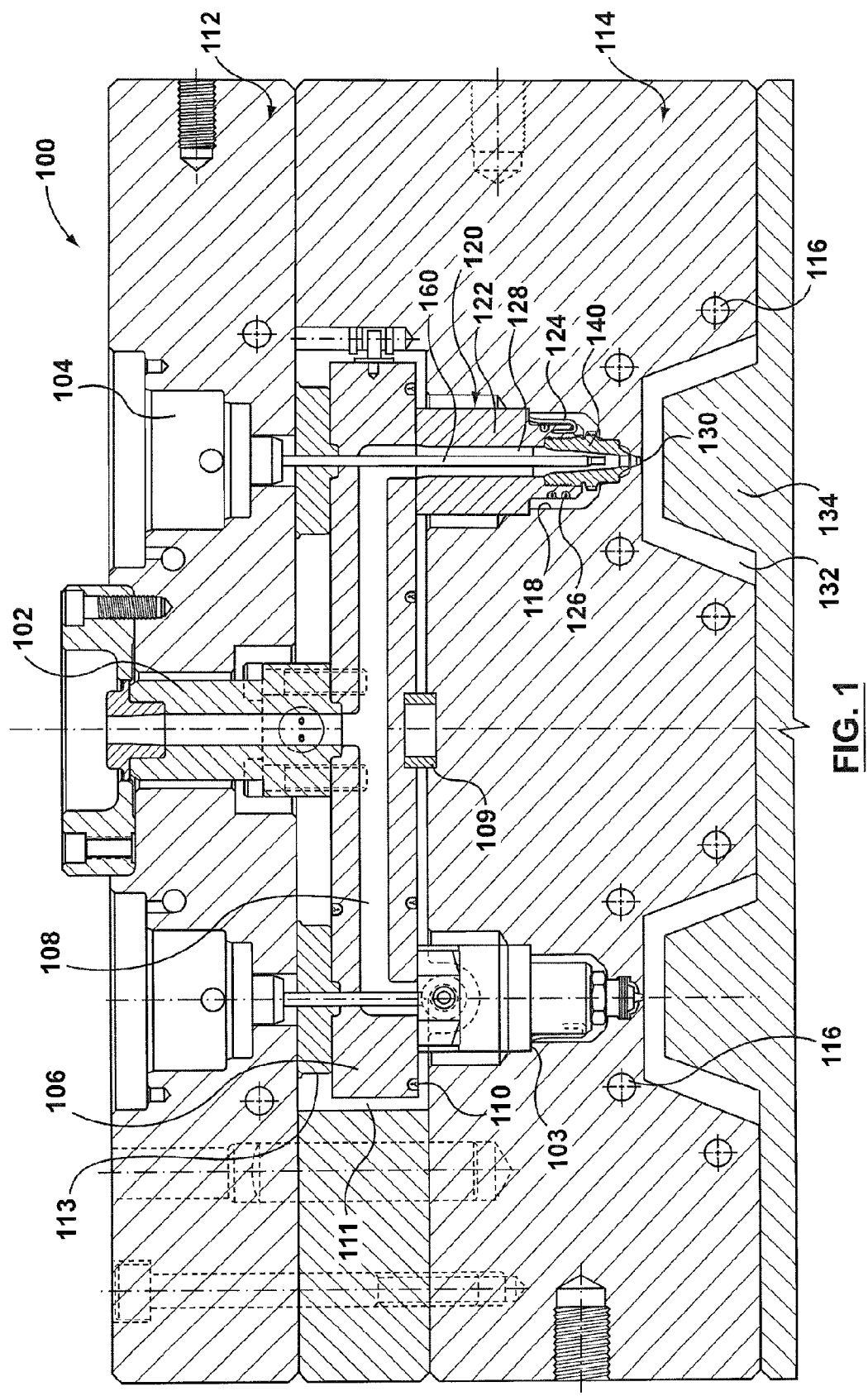
FIG. 1 is a partial sectional view of an injection molding system 100 in which embodiments of the present invention may be utilized.

An example of an injection molding system 100 in which embodiments of the present invention may be utilized is shown in FIG. 1. A machine nozzle (not shown) introduces a melt stream under pressure into injection molding system 100 via a sprue bushing or melt inlet 102 that is positioned within a back or clamping plate 112. From sprue bushing 102 the melt flows into a manifold melt channel 108 provided in a hot runner manifold 106. Manifold 106 is secured in position by a central locating ring 109, which bridges an insulative air space 111 between a lower surface of the heated manifold 110 and a cooled mold cavity plate 114, and by spacer or pressure disks 113, which bridge insulative air space 111 between an upper surface of manifold 106 and back plate 112. Spacers or pressure disks 113 also aid in sealing between valve-gated nozzles 120 and manifold 106, as well as in aligning and guiding valve pins 160.

In injection molding system 100, manifold 106 distributes the melt stream to respective nozzles 120. Hot runner nozzles 120 are positioned within nozzle bores or cavities 118 of mold cavity plate 114 and aligned with a respective mold gate 130 by a collar or alignment flange 103. As would be apparent to one of ordinary skill in the art, mold cavity plate 114 may be replaced by one or more mold plates and a mold cavity plate. A mold core plate 134 mates with mold cavity plate 114 to form mold cavities 132.

One of the valve-gated nozzles 120 illustrated in FIG. 1 is shown in cross-section. Hot runner nozzle 120 includes a nozzle body 122 having a nozzle melt channel 128 and nozzle tip 140 that is threadably coupled thereto. The nozzle tip is in fluid communication with a respective mold cavity 132 via mold gate 130 so that the melt stream may be injected through nozzle melt channel 128 and nozzle tip 140 into mold cavity 132. A valve pin 160 is movable within each nozzle melt channel 128 to open and close its respective mold gate 130.

Injection molding system 100 may include any number of such hot runner nozzles 120 located in respective nozzle bores 118 for distributing melt to respective mold cavities 132. Injection molding system 100 utilizes a heating element 110 in manifold 106, a heating element 126 in each nozzle 120, cooling channels 116 in mold cavity plate 114 and thermocouples 124 to moderate the temperature of the melt in the system. As shown, valve-gated nozzles 120 include valve pin actuators 104 for moving valve pins 120 between open and closed positions. Valve pin actuators 104 may be hydraulically, pneumatically, or electrically operated as would be understood by one of ordinary skill in the art.

Figure 2:
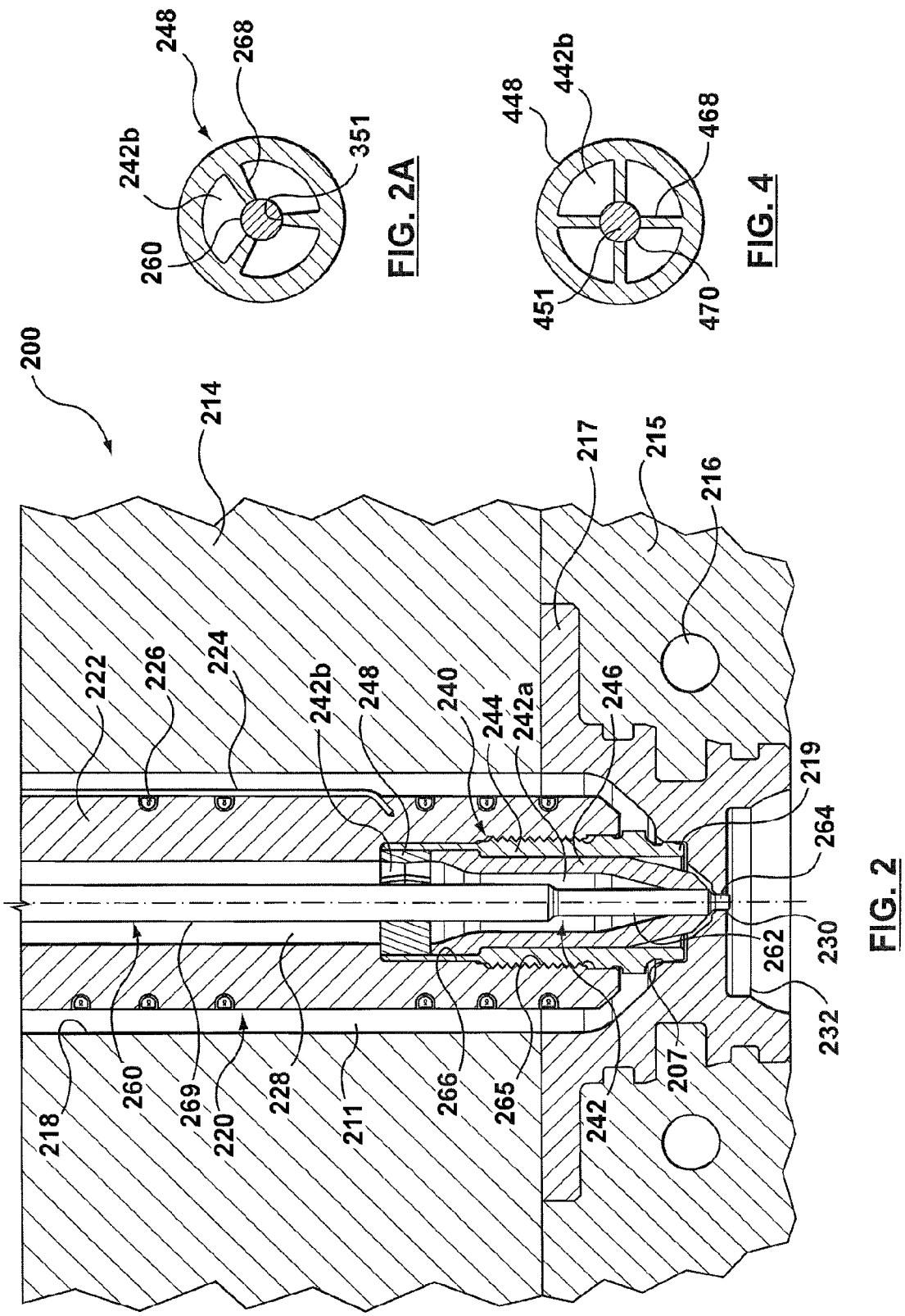
FIG. 2 is a sectional view of an injection molding apparatus according to an embodiment of the present invention.

FIG. 2 is a sectional view of a portion of an injection molding apparatus 200 according to an embodiment of the present invention. Valve-gated nozzle 220 is situated within nozzle bore 218 of mold plate 214 and is surrounded by an insulative air space 211. Nozzle 220 includes a nozzle body 222 defining a nozzle melt channel 228 and a nozzle tip assembly 240 defining a nozzle tip melt channel 242. Nozzle heater 226 provides heat to a melt stream within melt channels 228 and 242 and may be a wire element heater, as shown in FIG. 2, that is embedded within or simply wrapped around nozzle body 222. Other suitable nozzle heaters, such as band or cartridge heaters, may also be used without departing from the scope of the present invention. At least one thermocouple 224 monitors the operating temperature of injection molding apparatus 200 and regulates operation of nozzle heater 226 to achieve the desired operating parameters.

Figure 6A:
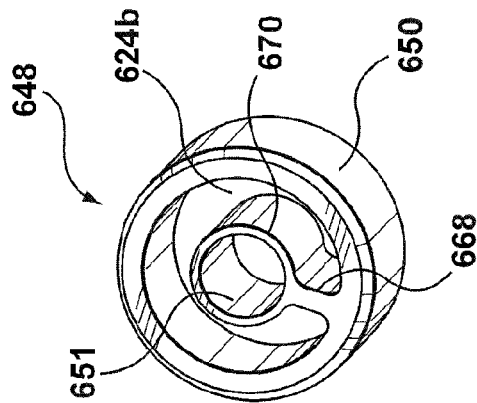
FIG. 6A is a perspective view of the valve pin guide of FIG. 6.
Figure 6:
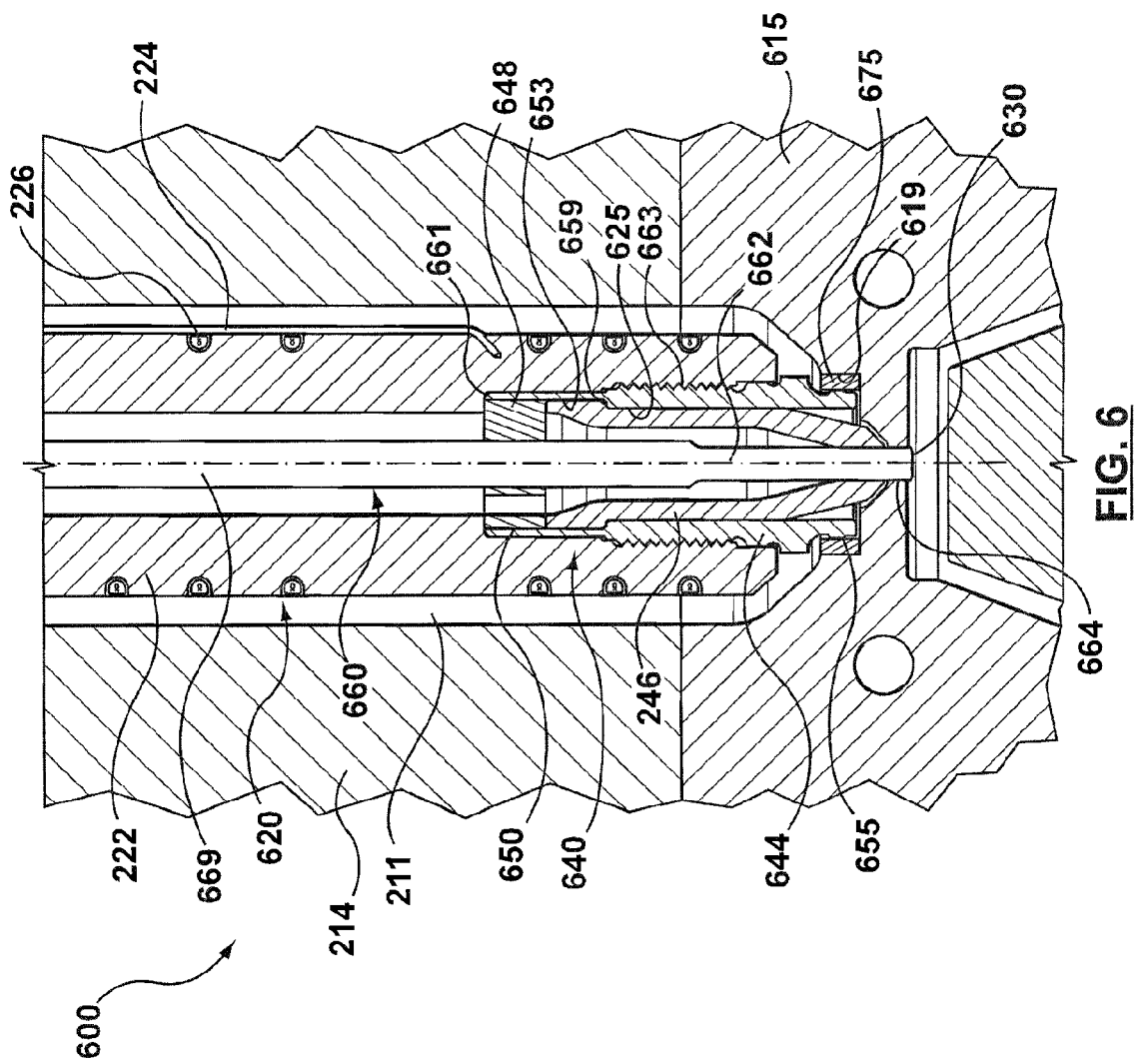
FIG. 6 is a sectional view of an injection molding apparatus according to another embodiment of the present invention.

A valve pin 260 is slidably disposed within nozzle melt channel 228 and nozzle tip melt channel 242 to move between an open and closed position to control the flow of melt into mold cavity 232. FIG. 2 shows valve pin 260 in the closed position with a head or tip portion 264 seated within mold gate 230. When valve pin head portion 264 is retracted from mold gate 230 into its open position, the melt flows through mold gate 230 into mold cavity 232. In the embodiment of FIG. 2 mold gate 230 is defined by a mold gate insert 217 that is positioned within mold plate 215. Mold gate insert 217 also has a surface that defines a portion of mold cavity 232. In an alternate embodiment, an arrangement as shown in FIG. 6 in which mold gate 630 is within mold cavity plate 615 is also contemplated to be within the scope of the present invention.

Figure 3:
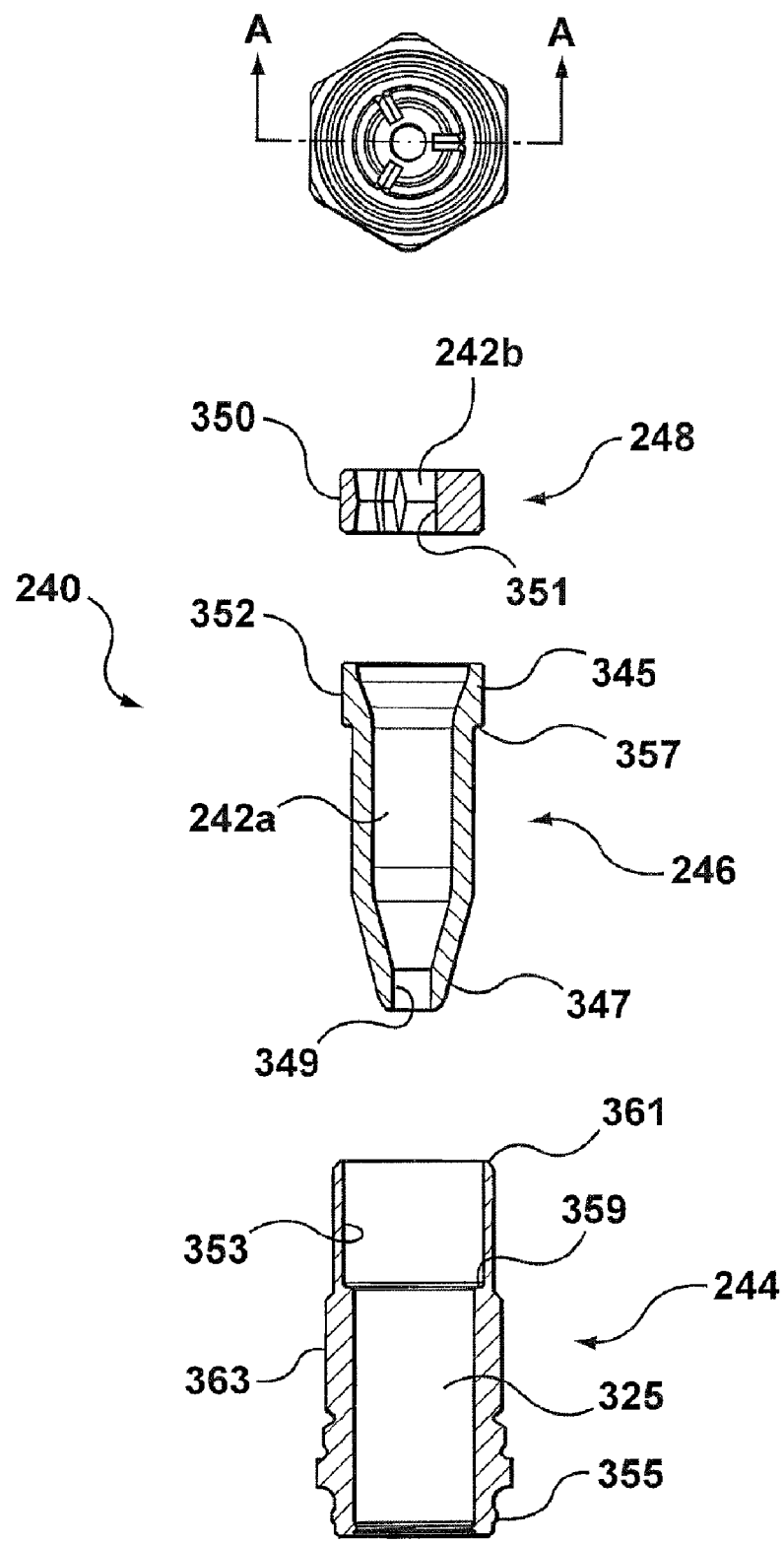
FIG. 3 is an expanded view of the nozzle tip assembly shown in FIG. 2.

As shown in FIG. 3, nozzle tip assembly 240 includes a nozzle liner 246 and a valve pin guide 248 disposed within a bore 325 of a transfer seal 244. A first portion 242a of nozzle tip melt channel 242 is defined within nozzle liner 246 and a second portion 242b of nozzle tip melt channel 242 is defined within valve pin guide 248.

Nozzle liner 246 includes a flange 357 that engages with or sits on a shoulder 359 of transfer seal bore 325. Nozzle liner 246 also includes an outer circumferential surface 352 above flange 357 that makes contact with an alignment surface 353 of transfer seal bore 325. Valve pin guide 248 sits on an upstream end 345 of nozzle liner 246 and also includes an outer circumferential surface 350 for making contact with alignment surface 353 of transfer seal bore 325. Valve pin guide 248 is sized, i.e., is of a length, such that it sits within an upstream end 361 of transfer seal 244. Transfer seal 244 includes threads 363 for engaging with corresponding threads 265 within counterbore 266 of nozzle body 222. In this manner, each of nozzle liner 246 and valve pin guide 248 are secured to nozzle body 222 by the threadable engagement of transfer seal 244 within counterbore 266. In alternate embodiments, transfer seal 244 may be brazed or soldered within counterbore 266. In other embodiments, nozzle liner 246 and valve pin guide 248 may be brazed within transfer seal 244 prior to transfer seal 244 being screwed into or attached by brazing/soldering with nozzle body 222. Further, alignment of both nozzle liner 246 and valve pin guide 248 is by the same surface of transfer seal 244, which is in a head portion of transfer seal 244 thereby relaxing tolerances normally needed between two or more of these components and nozzle body counterbore 266.

Nozzle 220 is positioned within insulative air space 211 such that a circumferential sealing surface 355 of transfer seal 244 makes contact with a nozzle sealing and alignment surface 207 of a nozzle sealing and alignment bore 219 within mold gate insert 217. In this manner, nozzle 220 and nozzle tip assembly 240 are properly aligned with mold gate 230.

Further, valve pin 260, which is slidably disposed within nozzle tip melt channel portions 242a, 242b of nozzle liner 246 and valve pin guide 248, respectively, is aligned with mold gate 230 by a first valve pin guiding portion 349 of nozzle liner 246 and a second valve pin guiding portion 351 of valve pin guide 248. First valve pin guiding portion 349 is in a downstream portion 347 of nozzle liner 246 and is sized to be in sliding contact with downstream portion 262 of valve pin 260, which in the embodiment shown in FIG. 2 is of a reduced diameter with respect to an upstream portion 269 of valve pin 260. As shown in FIG. 2A, second valve pin guiding portion 351 of valve pin guide 248 is defined by the end surfaces of fins 268 of valve pin guide 248. In an alternate embodiment shown in FIG. 4, a valve pin guide 448 includes hub 470 having an inner surface that defines second valve pin guiding portion 451, wherein hub 470 is centered within melt channel 442b of valve pin guide 448 by a plurality of spokes 468. Accordingly, valve pin 260 is guided twice, i.e., by first valve pin guiding portion 349 of nozzle liner 246 and second valve pin guiding portion 351 of valve pin guide 248.

Depending on the particular injection molding application, the operating temperature and desired wear and corrosion resistances, nozzle liner 246 may be made of a beryllium copper alloy, tungsten carbide, steel, an alloy of titanium, zirconium, and molybdenum (TZM), or a suitable ceramic. Valve pin guide 248 preferably is of a material having good wear resistance, for example, tungsten carbide, a ceramic, or steel, but may be made of any material known to be suitable for injection molding applications. Valve pin guide 248, particularly second valve pin guiding portion 351, may be coated with a lubricious material to reduce friction, such as with polytetrafluoroethylene (PTFE) which is sold under the trade name TEFLON. Transfer seal or retainer 244 may be made of, for example, steel, titanium, or a suitable ceramic to reduce heat transfer to gate insert 217 or mold plate 215, but depending on the injection molding application may be made of any of the other materials listed above for nozzle liner 246.

FIG. 5 is a sectional view of a portion of an injection molding apparatus 500 according to another embodiment of the present invention. Valve-gated nozzle 520 includes many of the same components as previously described with reference to the embodiment of FIG. 2; as such primarily the features not previously described are discussed in detail with respect to this embodiment.

With reference to FIGS. 2, 3 and 5, nozzle tip assembly 540 includes a nozzle liner 246 and a valve pin guide 248 disposed within a bore 525 of a gate insert 544. Nozzle liner 246 includes a flange 357 that engages with or sits on a shoulder 559 of gate insert bore 525. Nozzle liner 246 also includes an outer circumferential surface 352 above flange 357 that makes contact with an alignment surface 553 of gate insert bore 525. Valve pin guide 248 sits on an upstream end 345 of nozzle liner 246 and also includes an outer circumferential surface 350 for making contact with alignment surface 553 of gate insert bore 525. Valve pin guide 248 is sized, i.e., is of a length, such that it sits fully within an upstream end 561 of gate insert 544. Gate insert 544 includes threads 563 for engaging with corresponding threads 265 within counterbore 266 of nozzle body 222. In this manner, each of nozzle liner 246 and valve pin guide 248 are secured to nozzle body 222 by the threadable engagement of gate insert 544 within counterbore 266.

Valve pin 560 is slidably disposed within nozzle melt channel 228 and nozzle tip melt channel 242 to move between an open and closed position to control the flow of melt into mold cavity 532. FIG. 5 shows valve pin 560 in the closed position with a head or tip portion 564 seated within mold gate 530.

When valve pin head portion 564 is retracted from mold gate 530 into its open position, the melt flows through mold gate 530 into mold cavity 532. In the embodiment of FIG. 5, mold gate 530 is defined by gate insert 544 that also includes a downstream surface 531 that defines a portion of mold cavity 532.

Nozzle 520 is positioned within insulative air space 211 such that a circumferential sealing surface 555 of gate insert 544 makes contact with a nozzle sealing and alignment surface 507 of mold cavity plate 515. In this manner, nozzle tip assembly 540 with mold gate 230 is properly aligned with mold cavity 532. Further, valve pin 560, which is slidably disposed within nozzle tip melt channel portions 242a, 242b of nozzle liner 246 and valve pin guide 248, respectively, is aligned with mold gate 530 of gate insert 544 by a first valve pin guiding portion 349 of nozzle liner 246 and a second valve pin guiding portion 351 of valve pin guide 248. First valve pin guiding portion 349 is sized to be in sliding contact with downstream portion 562 of valve pin 560, which in the embodiment shown in FIG. 5 is of a reduced diameter with respect to an upstream portion 569 of valve pin 560 and includes a plurality of ribs 572.

FIG. 5A is a cross-sectional view of downstream portion 562 of valve pin 560, as better shown in this view ribs 572 include recesses 573 there between. Valve pin recesses 573 allow melt to flow through recesses 573 past downstream portion 562 of valve pin 560 upon removal of valve pin head 564 from mold gate 530, rather than requiring the full retraction of downstream portion 560 from first valve pin guiding portion 349 of nozzle liner 246 as is necessary in the arrangement shown in the embodiment of FIG. 2. Consequently in the arrangement of FIG. 5, ribs 572 maintain contact with first valve pin guiding portion 349 of nozzle liner 246 at all times during the injection molding cycle providing additional guidance of valve pin 560.

FIG. 6 is a sectional view of a portion of an injection molding apparatus 600 according to another embodiment of the present invention. Valve-gated nozzle 620 includes many of the same components as previously described with reference to the embodiment of FIG. 2; as such primarily the features not previously described are discussed in detail with respect to this embodiment.

With reference to FIGS. 2, 3 and 6, nozzle tip assembly 640 includes a nozzle liner 246 and a valve pin guide 648 disposed within a bore 325 of a tip retainer 644. A first portion 242a of nozzle tip melt channel 242 is defined within nozzle liner 246 and a second portion 642b of nozzle tip melt channel 242 is defined within valve pin guide 648. Nozzle liner 246 includes a flange 357 that engages with or sits on a shoulder 659 of tip retainer bore 625. Nozzle liner 246 also includes an outer circumferential surface 352 above flange 357 that makes contact with an alignment surface 653 of tip retainer bore 625. Valve pin guide 648 sits on an upstream end 345 of nozzle liner 246 and also includes an outer circumferential surface 650 for making contact with alignment surface 653 of tip retainer bore 625. Valve pin guide 648 is sized, i.e., is of a length, such that it sits within an upstream end 661 of tip retainer 644. Tip retainer 644 includes threads 663 for engaging with corresponding threads 265 within counterbore 266 of nozzle body 222. In this manner, each of nozzle liner 246 and valve pin guide 648 are secured to nozzle body 222 by the threadable engagement of tip retainer 644 within counterbore 266.

Nozzle 620 is positioned within insulative air space 211 such that a circumferential surface 655 of tip retainer 644 is seated within a mold contacting piece 675, which provides a seal with mold cavity plate 615. Mold contacting piece 675 may be secured to tip retainer 644 or may be fitted within nozzle sealing and alignment bore 619 of mold cavity plate 615 prior to assembly. Mold contacting piece 675 may be of any material and/or perform additional functions as described in U.S. Pat. No. 7,108,503 to Olaru, which is incorporated by reference herein in its entirety. In this manner, nozzle 620 and nozzle tip assembly 640 are properly aligned with mold gate 630, which as discussed previously is within mold cavity plate 615. Further, valve pin 660, which is slidably disposed within nozzle tip melt channel portions 242a, 642b of nozzle liner 246 and valve pin guide 648, respectively, is aligned with mold gate 630 by a first valve pin guiding portion 349 of nozzle liner 246 and a second valve pin guiding portion 651 of valve pin guide 648. First valve pin guiding portion 349 is in a downstream portion 347 of nozzle liner 246 and is sized to be in sliding contact with downstream portion 662 of valve pin 660, which in the embodiment shown in FIG. 6 is of a reduced diameter with respect to an upstream portion 669 of valve pin 660 and does not include a further defined valve pin head at a tip 664 thereof. As shown in FIG. 6A, which is a perspective view of valve pin guide 648, second valve pin guiding portion 651 is an inner surface of hub 670, wherein hub 670 is centered by a single spoke 668 within melt channel 642b.

Figure 7:
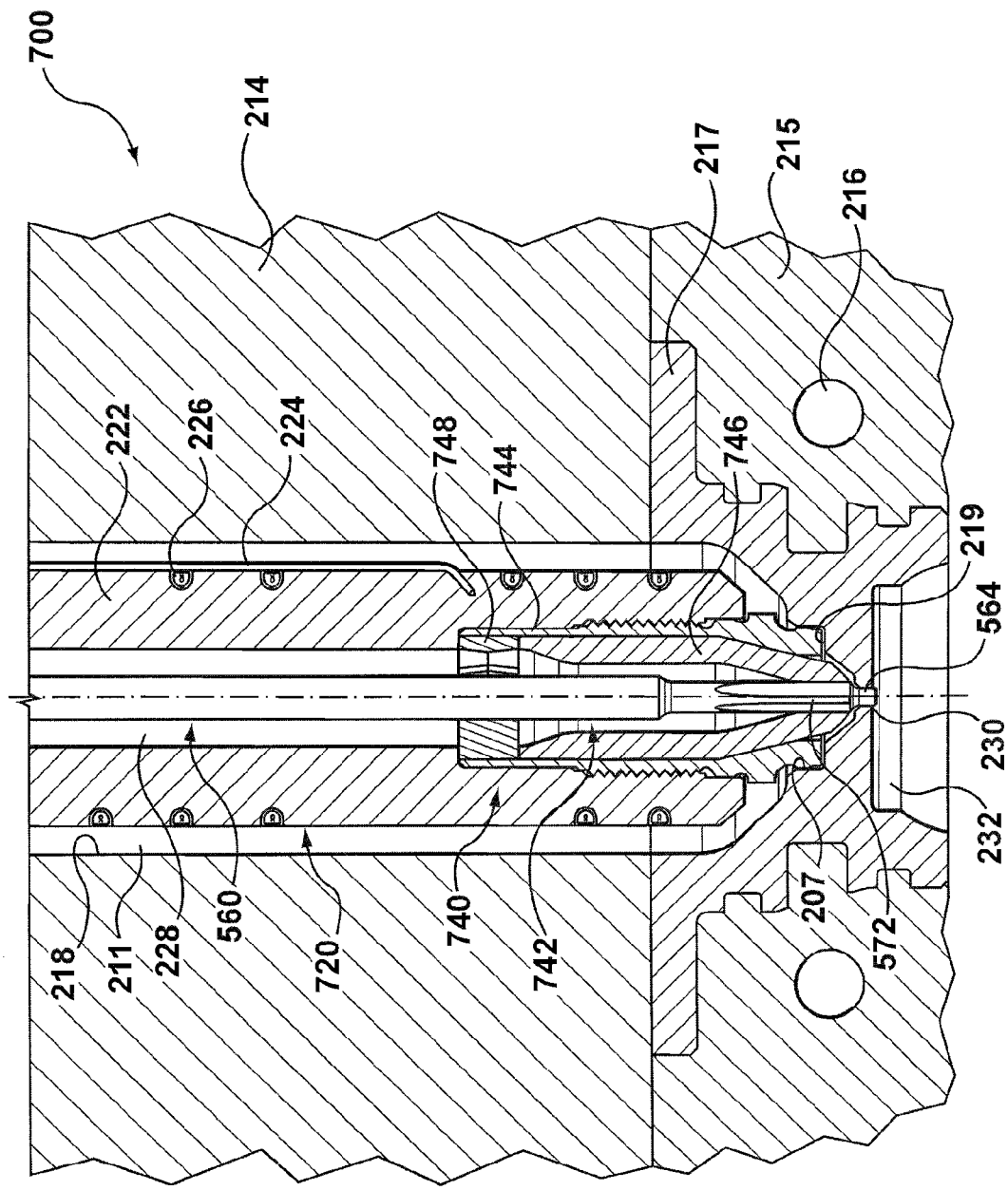
FIG. 7 is a sectional view of an injection molding apparatus according to another embodiment of the present invention.

FIG. 7 is a sectional view of a portion of an injection molding apparatus 700 according to another embodiment of the present invention. Valve-gated nozzle 720 includes many of the same components as previously described with reference to the embodiments of FIGS. 2 and 5, as such primarily the features not previously described are discussed in detail with respect to this embodiment.

Valve-gated nozzle 720 is situated within nozzle bore 218 of mold plate 214 and is surrounded by insulative air space 211. Nozzle 720 includes nozzle body 222 defining a nozzle melt channel 228 and nozzle tip assembly 740 defining nozzle tip melt channel 742. Nozzle heater 226 provides heat to a melt stream within melt channels 228 and 742 and may be a wire element heater that is embedded within or simply wrapped around nozzle body 222. Other suitable nozzle heaters, such as band or cartridge heaters, may also be used without departing from the scope of the present invention. At least one thermocouple 224 monitors the operating temperature of injection molding apparatus 700 and regulates operation of nozzle heater 226 to achieve the desired operating parameters.

Valve pin 560 is slidably disposed within nozzle melt channel 228 and nozzle tip melt channel 242 to move between an open and closed position to control the flow of melt into mold cavity 232. FIG. 7 shows valve pin 560 in the closed position with a tip portion 564 seated within mold gate 230, which is defined by mold gate insert 217 positioned within mold plate 215. When valve pin tip portion 564 is retracted from mold gate 230 into its open position, the melt flows through mold gate 230 into mold cavity 232. As discussed above, valve pin 560 includes ribs 572 and recesses 573 there between, wherein recesses 573 allow melt to flow by downstream portion 562 of valve pin 560 upon removal of valve pin tip 564 from mold gate 230.

Figure 8:
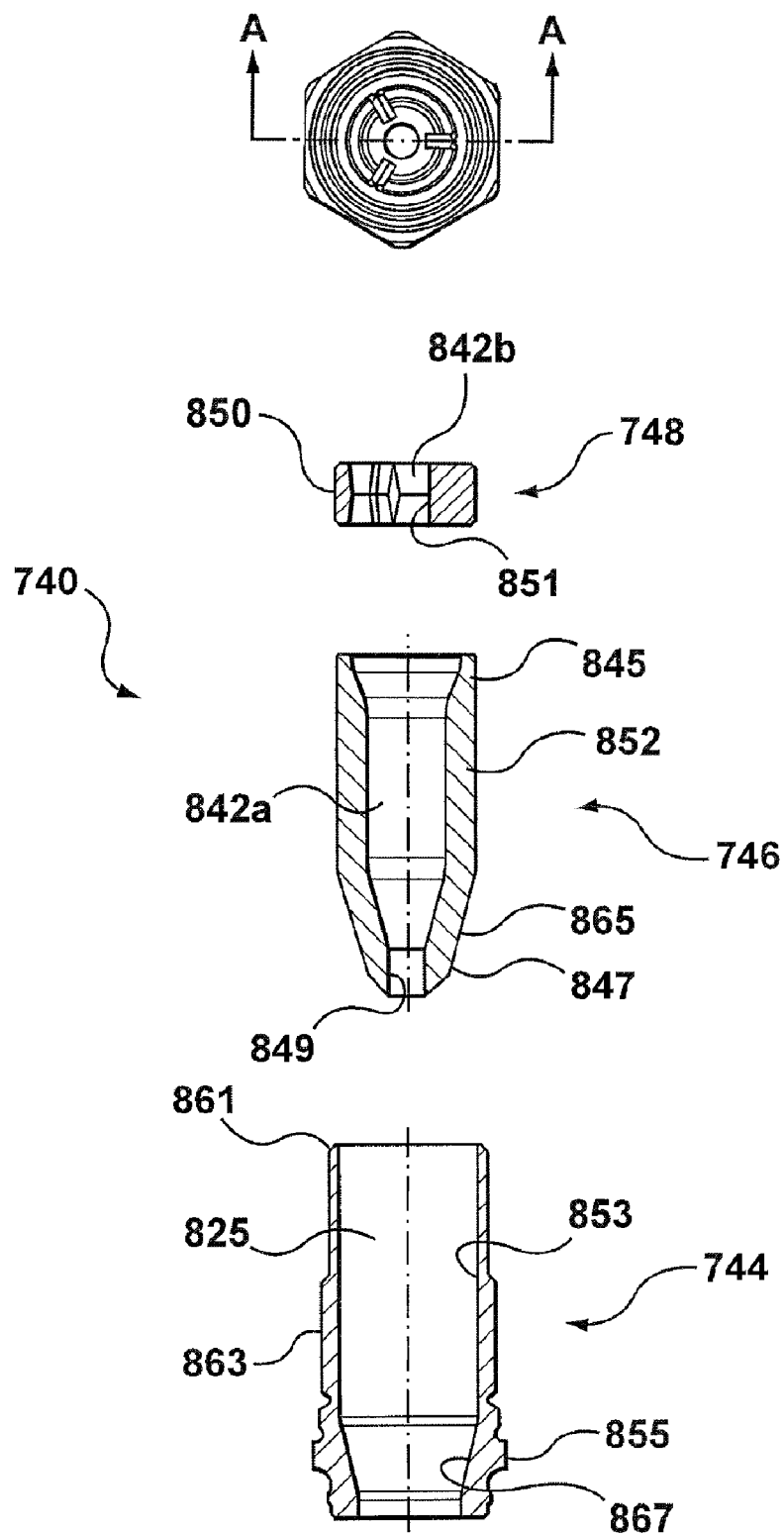
FIG. 8 is an expanded view of the nozzle tip assembly shown in FIG. 7.

With reference to FIGS. 2, 7 and 8, nozzle tip assembly 740 includes a nozzle liner 746 and a valve pin guide 748 disposed within a bore 825 of a transfer seal 744. A first portion 842a of nozzle tip melt channel 742 is defined within nozzle liner 746 and a second portion 842b of nozzle tip melt channel 742 is defined within valve pin guide 748. Nozzle liner 746 includes a tapered downstream portion 865 that makes contact with an inwardly angled surface 867 of transfer seal bore 825. Nozzle liner 746 also includes an outer circumferential surface 852 above tapered downstream portion 865 that makes contact with an alignment surface 853 of transfer seal bore 825. Valve pin guide 748 sits on an upstream end 845 of nozzle liner 746 and also includes an outer circumferential surface 850 for making contact with alignment surface 853 of transfer seal bore 825. Valve pin guide 748 is sized, i.e., is of a length, such that it sits fully within an upstream end 861 of transfer seal 744. Transfer seal 744 includes threads 863 for engaging with corresponding threads 265 within counterbore 266 of nozzle body 222. In this manner, each of nozzle liner 746 and valve pin guide 748 are secured to nozzle body 222 by the threadable engagement of transfer seal 744 within counterbore 266.

Nozzle 720 is positioned within insulative air space 211 such that a circumferential sealing surface 855 of transfer seal 744 makes contact with a nozzle sealing and alignment surface 207 of a nozzle sealing and alignment bore 219 within mold gate insert 217. In this manner, nozzle 720 and nozzle tip assembly 740 are properly aligned with mold gate 230. Further, valve pin 560, which is slidably disposed within nozzle tip melt channel portions 842a, 842b of nozzle liner 746 and valve pin guide 748, respectively, is aligned with mold gate 230 by a first valve pin guiding portion 849 of nozzle liner 746 and a second valve pin guiding portion 851 of valve pin guide 748. First valve pin guiding portion 849 is in a downstream portion 847 of nozzle liner 746 and is sized to be in sliding contact with ribs 572 of valve pin 560. Second valve pin guiding portion 851 of valve pin guide 748 is defined as described above with reference to valve pin guide 248 in FIG. 2A.

Figure 9:
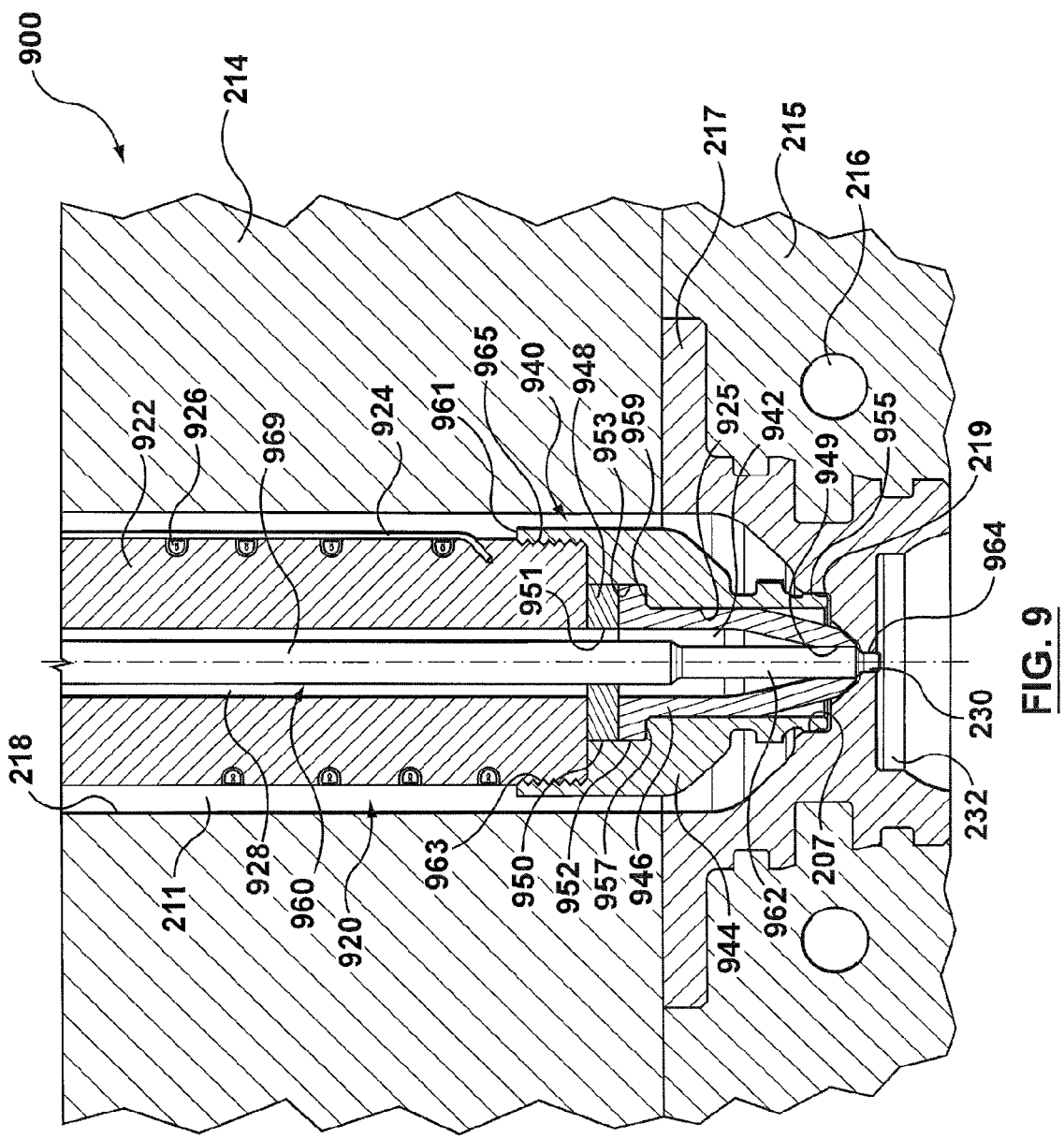
FIG. 9 is a sectional view of an injection molding apparatus according to another embodiment of the present invention.

FIG. 9 is a sectional view of a portion of an injection molding apparatus 900 according to another embodiment of the present invention. As similarly described in the previous embodiments, valve-gated nozzle 920 is situated within nozzle bore 218 of mold plate 214 and is surrounded by insulative air space 211. Nozzle 920 includes a nozzle body 922 defining a nozzle melt channel 928 and a nozzle tip assembly 940 defining a nozzle tip melt channel 942. Nozzle heater 926 provides heat to a melt stream within melt channels 928 and 942 and may be a wire element heater, as shown in FIG. 9, that is embedded within or simply wrapped around nozzle body 922. At least one thermocouple 924 monitors the operating temperature of injection molding apparatus 900 and regulates operation of nozzle heater 926 to achieve the desired operating parameters.

A valve pin 960 is slidably disposed within nozzle melt channel 928 and nozzle tip melt channel 942 to move between an open and closed position to control the flow of melt into mold cavity 232. FIG. 9 shows valve pin 960 in the closed position with a head or tip portion 964 seated within mold gate 230. When valve pin head portion 964 is retracted from mold gate 230 into its open position, the melt flows through mold gate 230 into mold cavity 232.

Nozzle tip assembly 940 includes a nozzle liner 946 and a valve pin guide 948 disposed within a bore 925 of a retainer seal 944. Nozzle liner 946 includes a flange 957 that engages with or sits on a shoulder 959 of transfer seal bore 925. Nozzle liner 946 also includes an outer circumferential surface 952 above flange 957 that makes contact with an alignment surface 953 of transfer seal bore 925. Valve pin guide 948 sits on an upstream end of nozzle liner 946 and also includes an outer circumferential surface 950 for making contact with alignment surface 953 of transfer seal bore 925. Valve pin guide 948 sits within an upstream end 961 of retainer seal 944. Retainer seal 944 includes internal threads 963 for engaging with corresponding threads 965 on an exterior of nozzle body 922. In this manner, each of nozzle liner 946 and valve pin guide 948 are secured to nozzle body 922 by the threadable engagement of retainer seal 944 therewith.

In alternate embodiments, retainer seal 944 may be brazed or soldered to nozzle body 922. In other embodiments, nozzle liner 946 and valve pin guide 948 may be brazed within retainer seal 944 prior to retainer seal 944 being screwed into or attached by brazing/soldering with nozzle body 922. Further, alignment of both nozzle liner 946 and valve pin guide 948 is by the same surface of retainer seal 944, thereby relaxing tolerances normally needed between two or more of these components and nozzle body 966.

Nozzle 920 is positioned within insulative air space 211 such that a circumferential sealing surface 955 of retainer seal 944 makes contact with a nozzle sealing and alignment surface 207 of nozzle sealing and alignment bore 219 within mold gate insert 217. In this manner, nozzle 920 and nozzle tip assembly 940 are properly aligned with mold gate 230. Further, valve pin 960, which is slidably disposed within nozzle tip melt channel portion 942 is aligned with mold gate 230 by a first valve pin guiding portion 949 of nozzle liner 946 and a second valve pin guiding portion 951 of valve pin guide 948. First valve pin guiding portion 949 is in a downstream portion of nozzle liner 946 and is sized to be in sliding contact with downstream portion 962 of valve pin 960, which in the embodiment shown in FIG. 9 is of a reduced diameter with respect to an upstream portion 969 of valve pin 960. Accordingly, valve pin 960 is guided twice proximate mold gate 230, i.e., by first valve pin guiding portion 949 of nozzle liner 946 and second valve pin guiding portion 951 of valve pin guide 948.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An injection molding apparatus comprising:
a mold plate having a nozzle bore;
a valve-gated nozzle positioned within the nozzle bore, the nozzle having a nozzle body defining a nozzle melt channel for receiving a melt stream of moldable material from a melt source, a nozzle tip assembly secured to a downstream end of the nozzle body having a nozzle tip melt channel in fluid communication with the nozzle melt channel, and a valve pin slidably disposed therein, wherein the melt stream of moldable material is conveyed through the nozzle and nozzle tip melt channels to a mold cavity via a mold gate that is selectively opened and closed by the valve pin, wherein the nozzle tip assembly includes,
a nozzle liner having an upstream end, a downstream end and defining a first portion of the nozzle tip melt channel, wherein the downstream end of the nozzle liner includes a first valve pin guiding portion for aligning the valve pin with the mold gate,
a valve pin guide positioned in contact with the upstream end of the nozzle liner and defining a second portion of the nozzle tip melt channel, wherein the valve pin guide includes a second valve pin guiding portion upstream of the first valve pin guiding portion for aligning the valve pin with the mold gate, and
a transfer seal having a bore for receiving the nozzle liner and the valve pin guide therein, wherein the transfer seal bore has an alignment surface that surrounds the nozzle liner and the valve pin guide to align the first and second valve pin guiding portions with the mold gate and wherein the transfer seal couples the nozzle tip assembly to the nozzle body.

2. The injection molding apparatus of claim 1, wherein the transfer seal further includes a sealing surface that seals against a nozzle alignment and sealing surface proximate the mold gate.

3. The injection molding apparatus of claim 2, wherein the nozzle alignment and sealing surface is within a bore in a second mold plate.

4. The injection molding apparatus of claim 2, wherein the nozzle alignment and sealing surface is within a bore in a gate insert that defines the mold gate.

5. The injection molding apparatus of claim 1, wherein the nozzle liner has a flange that sits on a shoulder of the transfer seal bore.

6. The injection molding apparatus of claim 5, wherein the alignment surface of the transfer seal is between an upstream end of the transfer seal and the shoulder.

7. The injection molding apparatus of claim 1, wherein the transfer seal threadably couples the nozzle tip assembly to the nozzle body.

8. The injection molding apparatus of claim 1, wherein the nozzle liner has a tapered downstream portion that makes contact with an inwardly angled surface of the transfer seal bore.

9. The injection molding apparatus of claim 1, wherein the valve pin guide includes a plurality of fins that extend into the portion of the nozzle tip melt channel defined by the valve pin guide, wherein the inner ends of the fins define the second valve pin guiding portion.

10. The injection molding apparatus of claim 1, wherein the valve pin guide includes a plurality of spokes connected by a hub centrally located within the portion of the nozzle tip melt channel defined by the valve pin guide, wherein the hub defines the second valve pin guiding portion.

11. The injection molding apparatus of claim 1, wherein a downstream end of the transfer seal defines the mold gate.

12. The injection molding apparatus of claim 1, wherein a downstream portion of the valve pin includes a plurality of ribs proximate a head of the valve pin such that the ribs contact the first valve pin guiding portion of the nozzle liner.

13. The injection molding apparatus of claim 12, wherein removal of the head of the valve pin from the mold gate allows the melt to flow by the ribs of the valve pin without fully retracting the valve pin from the first valve pin guiding portion.

14. The injection molding apparatus of claim 1, wherein the valve pin guide includes a spoke for centrally positioning a hub within the portion of the nozzle tip melt channel defined by the valve pin guide, wherein the hub defines the second valve pin guiding portion.

15. The injection molding apparatus of claim 1, further comprising:
a mold contacting piece surrounding a downstream end of the transfer seal and having a sealing surface that seals against a nozzle alignment and sealing surface proximate the mold gate.

16. The injection molding apparatus of claim 15, wherein the nozzle alignment and sealing surface is within a bore in a second mold plate.

17. The injection molding apparatus of claim 15, wherein the nozzle alignment and sealing surface is within a bore in a gate insert that defines the mold gate.

18. The injection molding apparatus of claim 1 further comprising:

a manifold positioned upstream of the nozzle and having a manifold melt channel for conveying the melt stream of moldable material from the melt source to the nozzle melt channel.

* * * * *